United States Patent [19]
Uda

[11] 3,975,619
[45] Aug. 17, 1976

[54] ILLUMINATED ELECTRIC CIGAR LIGHTER

[75] Inventor: Toshio Uda, Tokyo, Japan

[73] Assignee: Niles Parts Co., Ltd., Tokyo, Japan

[22] Filed: June 16, 1975

[21] Appl. No.: 587,113

[30] Foreign Application Priority Data
Mar. 17, 1975  Japan .............................. 50-34645

[52] U.S. Cl. .............................. 219/269; 219/220; 219/267; 240/2 CL
[51] Int. Cl.² .......................................... E23Q 7/22
[58] Field of Search .................. 219/220, 267, 269; 280/150 R; 240/2 CL

[56] References Cited
UNITED STATES PATENTS

| | | | |
|---|---|---|---|
| 2,144,376 | 1/1939 | Johnson | 219/269 X |
| 2,243,639 | 3/1941 | Lehmann | 219/269 |
| 2,419,950 | 5/1947 | Johnson | 219/269 |
| 2,506,181 | 5/1950 | Thibault | 219/269 X |
| 2,514,171 | 7/1950 | Waltner, Jr. | 219/269 |
| 2,692,938 | 10/1954 | Cone | 219/269 X |
| 3,502,887 | 3/1970 | Erickson et al. | 250/218 |

FOREIGN PATENTS OR APPLICATIONS
767,444  2/1957  United Kingdom ................ 219/220

*Primary Examiner*—Volodymyr Y. Mayewsky
*Attorney, Agent, or Firm*—Gifford, Chandler & Sheridan

[57] ABSTRACT

This invention relates to cigar lighters of the removable igniting unit type. According to this invention the core of the knob mounted on the igniting unit is made of a material having the property of piping light. A lamp housing is mounted on the sleeve of the holding device over a side wall opening thereof. An electric lamp in said housing produces light to pass into the interiors of the shell as well as the core of the knob whereby the front of the knob is illuminated clearly in the dark when the igniting unit is in place on the holding device and the interior of the shell is well illuminated when the igniting unit is removed. Therefore, by the provision of the present improved illuminating means, a much increased degree of safety is provided for the driver who travels at high speed at night to obtain a light for his cigarette without slowing down.

1 Claim, 1 Drawing Figure

U.S. Patent  Aug. 17, 1976  3,975,619
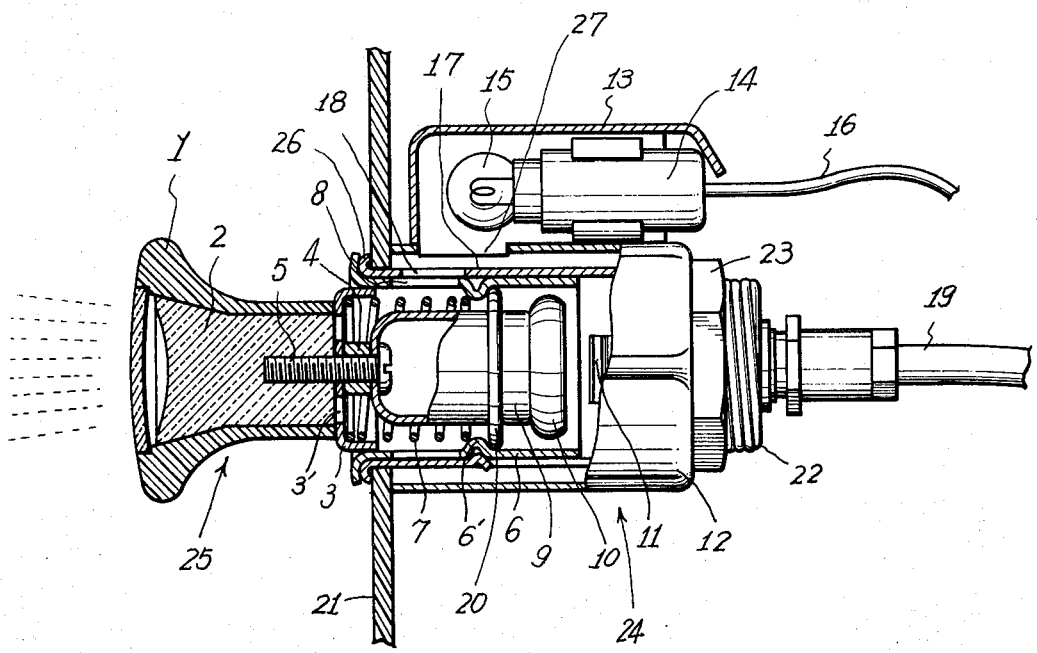

ILLUMINATED ELECTRIC CIGAR LIGHTER

BACKGROUND OF THE INVENTION

This invention relates to electric cigar lighter of the type used in automobiles and the like, and more particularly to cigar lighters of the removable igniting unit type.

SUMMARY OF THE PRESENT INVENTION

According to this invention, the front of the knob is illuminated clearly when the igniting unit is placed in the holding device of the cigar lighter and the interior of the shell of the holdng device is illuminated when the igniting unit is removed whereby the driver who travels at high speeds at night can quickly locate the unit when in use and quickly replace the unit after use, all without diverting his eyes from the road for more than a very small fraction of time.

BRIEF DESCRIPTION OF THE DRAWING

This invention is illustrated in the accompanying drawing showing a sectional view of the invented illuminated cigar lighter.

DETAILED DESCRIPTION OF THE PRESENT INVENTION

As shown, the illuminated cigar lighter according to this invention comprises a holding device generally designated by the numeral 24, having a front opening to receive a removable igniting unit which is designated generally by the numeral 25.

The igniting unit 25 includes a knob 1 mounted on a cap 3, and having a plurality of openings 3'. The core 2 of said knob is made of a material having the property of piping light, that is, conducting light, such as methyl methacrylate resin. A body portion 20 of the igniting unit 25 carries at its inner end a heating element 10 adapted to be energized through bimetallic spring clips 11 of the holding device whenever the igniting unit is moved inwardly or to the right against the action of the spring 7 from the position shown in the drawing. Said body portion and the cap 3 are connected with the light conducting core 2 of the knob by means of a screw 5 through a spacer 4.

The holding device comprises a tubular shell 17 havng an outturned flange 26 at its front, for disposition at the front of a panel 21 on which the holding device is mounted. The shell 17 has a plurality of openings 18 in its side wall and carries at its rear a threaded cup 22 on which is screwed a clamping nut 23 arranged to engage the back of the panel 21 to clamp the holding device securely thereto.

The outer shell 6 of the igniting unit is provided with an inwardly projected rim 6' around its periphery adapted to engage with the rim 20 provided around the body portion 9 so as to prevent the forward movement of the latter. Between the rim 6' and the cap 3, a coil spring 7 is arranged.

Current is brought to the bimetallic clip 11 through a lead wire 19 in the usual manner.

For the purpose of illuminating the knob 1, an electric illuminating means comprising a lamp housing 13 carrying a socket 14 in which an electric lamp 15 is mounted is provided on the sleeve 12 of the holding device. Current for the lamp is brought through a lead wire 16. The housing 13 is partially tubular, having an open bottom disposed against the exterior of the sleeve 12, and the lower or bottom edge portions of the housing are provided with projections 27 which protrude into the opening provided in the side wall of the sleeve 12.

It will be understood that the light from the lamp 15 passes into the interior of the clamping sleeve 12 and from the interior of said clamp sleeve, light passes through the openings 18, 8 and 3' into the core 2 to thereby illuminate the front of the knob 1 when the igniting unit is in place on the holding device. Accordingly the knob 1 will be clearly illuminated, enabling a user to quickly locate the knob in the dark whenever he desires to use the cigar lighter. Further, when the igniting unit is removed from the clamping device as for use, the interior of the shell 17 is brightly illuminated whereby replacement of the igniting unit is much facilitated.

By the provision of the present improved illuminating means a much increased degree of safety is provided for the driver who travels at high speed at night to obtain a light for his cigarette without slowing down, for the reason that the knob 1 of the igniting unit is well illuminated to enable the driver to quickly locate the unit, and for the reason that the interior of the shell 17 is brightly illuminated to enable the driver to quickly replace the igniting unit after use, all without requiring that he divert his eyes from the road for more than a small fraction of time.

Except the above mentioned illuminating means, the electric cigar lighter shown in this invention is of the well known removable igniting unit type.

What I claim:

1. In a cigar lighter,
    a holding device comprising a tubular shell having an igniting unit opening in its front portion; an electric igniting unit having an outer shell being mounted in said tubular shell;
    means including a tubular sleeve surrounding the shell, for mounting the latter on a panel through an aperture thereof, said sleeve, tubular shell and outer shell having registering side wall openings to admit light from outside the sleeve into the interior of the tubular shell and the outer shell of the igniting unit;
    a lamp housing being mounted on the sleeve over a side wall opening thereof;
    an electric lamp in said housing for producing light to pass through said wall openings and into the interiors of the shell and the igniting unit; and
    a knob being mounted on the igniting unit and having a core of light transparent illuminating material, said knob having at least one opening at the mounted end thereof between said core and the interior of said igniting unit to permit the transmission of the light from the interior of said igniting unit and through said transparent core.

* * * * *